(12) United States Patent
Lee et al.

(10) Patent No.: US 12,740,595 B2
(45) Date of Patent: Sep. 22, 2026

(54) AEROSOL GENERATING DEVICE

(71) Applicant: KT&G CORPORATION, Daejeon (KR)

(72) Inventors: Won Kyeong Lee, Gyeonggi-do (KR); Jong Sub Lee, Gyeonggi-do (KR); Byung Sung Cho, Gyeonggi-do (KR)

(73) Assignee: KT&G CORPORATION, Daejeon (KR)

( * ) Notice: Subject to any disclaimer, the term of this patent is extended or adjusted under 35 U.S.C. 154(b) by 869 days.

(21) Appl. No.: 17/928,259

(22) PCT Filed: Jul. 22, 2022

(86) PCT No.: PCT/KR2022/010774
§ 371 (c)(1),
(2) Date: Nov. 28, 2022

(87) PCT Pub. No.: WO2023/022378
PCT Pub. Date: Feb. 23, 2023

(65) Prior Publication Data

US 2024/0292902 A1 Sep. 5, 2024

(30) Foreign Application Priority Data

Aug. 20, 2021 (KR) ........................ 10-2021-0110305
Oct. 27, 2021 (KR) ........................ 10-2021-0144965

(51) Int. Cl.
*H02M 3/158* (2006.01)
*A24F 40/05* (2020.01)
(Continued)

(52) U.S. Cl.
CPC .............. *A24F 40/50* (2020.01); *A24F 40/05* (2020.01); *H01M 10/425* (2013.01);
(Continued)

(58) Field of Classification Search
CPC .......... A24F 40/50; A24F 40/05; H02J 7/855; H01M 10/425; H02M 3/158; H02M 2220/30
See application file for complete search history.

(56) References Cited

U.S. PATENT DOCUMENTS 10,765,146 B2 9/2020 Sur et al.
2008/0173729 A1 7/2008 Weng et al.
(Continued)

FOREIGN PATENT DOCUMENTS

CN 207574531 U 7/2018
CN 211861807 U 11/2020
(Continued)

OTHER PUBLICATIONS

Extended European Search Report dated Sep. 25, 2023 in Application No. 22802861.9.
(Continued)

*Primary Examiner* — Adolf D Berhane
(74) *Attorney, Agent, or Firm* — Foley & Lardner LLP

(57) ABSTRACT

According to an embodiment, an aerosol generating device may include a battery configured to supply a battery voltage, a first boost circuit configured to boost the battery voltage to a first boost voltage higher than the battery voltage, a second boost circuit configured to generate first and second switching voltages respectively based on first and second PWM signals, and boost the first boost voltage to a second boost voltage according to the generated first and second switching voltages, a vibrator configured to generate ultrasonic vibration according to the second boost voltage, and atomize an aerosol generating material, and a processor configured to control the battery, the first boost circuit, and the second boost circuit.

12 Claims, 9 Drawing Sheets

(51) Int. Cl.

| | |
|---|---|
| ***A24F 40/50*** | (2020.01) |
| ***H01M 10/42*** | (2006.01) |
| ***H02J 7/00*** | (2006.01) |

(52) U.S. Cl.

CPC ............ *H02J 7/855* (2026.01); *H02M 3/158* (2013.01); *H01M 2220/30* (2013.01)

(56) References Cited

U.S. PATENT DOCUMENTS

| | | | | |
|---|---|---|---|---|
| 2014/0334804 | A1 | 11/2014 | Choi | |
| 2018/0035714 | A1 | 2/2018 | Sur et al. | |
| 2019/0281890 | A1 | 9/2019 | Sur | |
| 2020/0128878 | A1 | 4/2020 | Stura et al. | |
| 2020/0375259 | A1 | 12/2020 | Mizuguchi et al. | |
| 2021/0259323 | A1 | 8/2021 | Marubashi et al. | |
| 2024/0148072 | A1* | 5/2024 | Lee ......................... | A24F 40/60 |
| 2025/0386876 | A1* | 12/2025 | Jung ..................... | A24F 40/465 |
| 2026/0060324 | A1* | 3/2026 | Lee ......................... | A24F 40/48 |

FOREIGN PATENT DOCUMENTS

| | | | |
|---|---|---|---|
| EP | 3 677 133 | A1 | 7/2020 |
| EP | 3 797 611 | A1 | 3/2021 |
| EP | 3 677 133 | B1 | 12/2022 |
| JP | 2019-527558 | A | 10/2019 |
| JP | 2020-535846 | A | 12/2020 |
| JP | 6888138 | B1 | 6/2021 |
| KR | 10-1345358 | B1 | 12/2013 |
| KR | 10-2020-0031651 | A | 3/2020 |
| TW | 201526501 | A | 7/2015 |

OTHER PUBLICATIONS

Korean Office Action dated May 24, 2023 in Application No. 10-2021-0144965.

International Search Report for PCT/KR2022/010774 dated Jul. 22, 2022 [PCT/ISA/210].

Written Opinion for PCT/KR2022/010774 dated Jul. 22, 2022 [PCT/ISA/237].

Chinese Office Action on CN Patent Appl. No. 202280004079.8 dated Feb. 5, 2026.

Heenshu et al., "Power Electronics Technology," 2004, Chinese Power Press, pp. 224-251.

Office Action issued Feb. 6, 2024 in Japanese Application No. 2022-575486.

"Variable input current limiting function, 1.5 a small boost converter", Texas Instruments, TPS61252, 2013 (7 pages total).

Chenghua et al., "Mechatronics Technology," 2nd ed. Beijing: China Agricultural University Press, Aug. 2008, 9 pages.

CN Office Action on CN Appl. No. 202280004079.8 dated Aug. 1, 2026 (23 pages).

Hongqi et al., "Modern High-Frequency Switching Power Supply Technology and Its Application," Harbin Institute of Technology Press, 2018, 8 pages.

Zhenhua, "Ultrasonic Cleaning Technology," Wuhan University of Technology Press, Sep. 2019, 9 pages.

Zhiliang, "New Power Electronic Devices and Their Application Technologies," National Defense Industry Press, Jun. 1995, 28 pages.

* cited by examiner

【Figure 1】
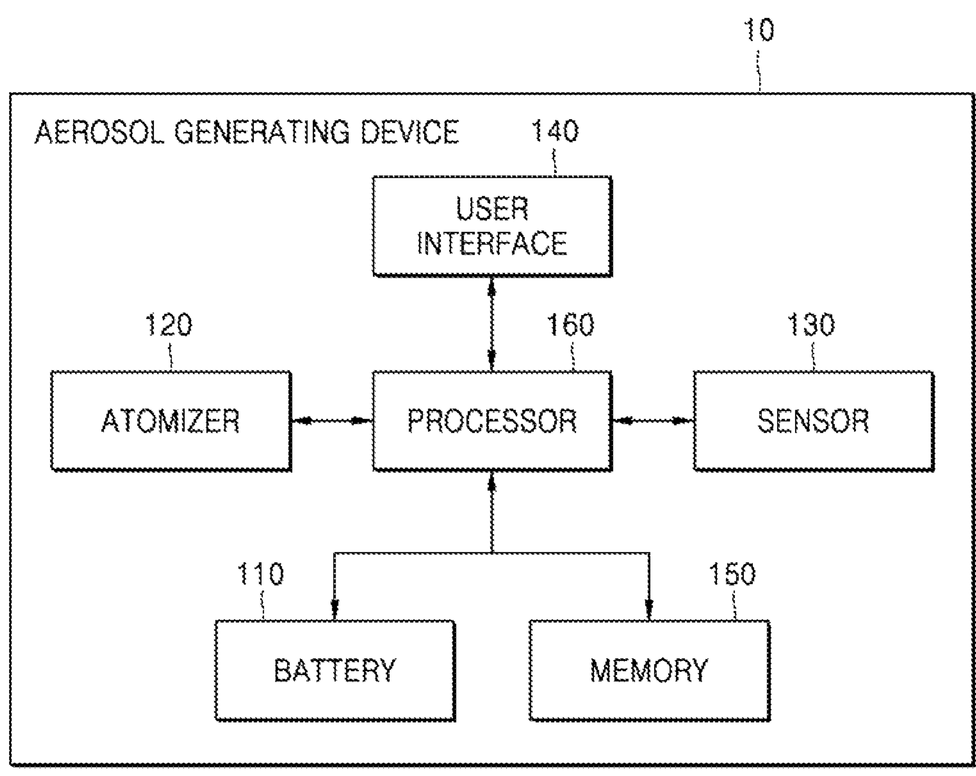

【Figure 2】
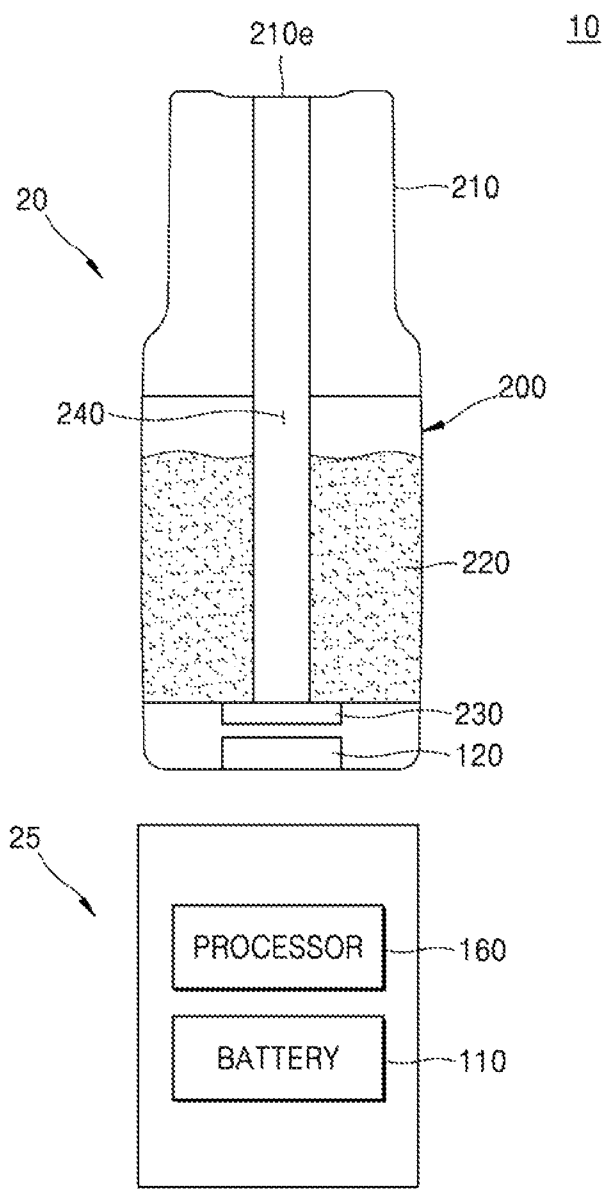

【Figure 3】
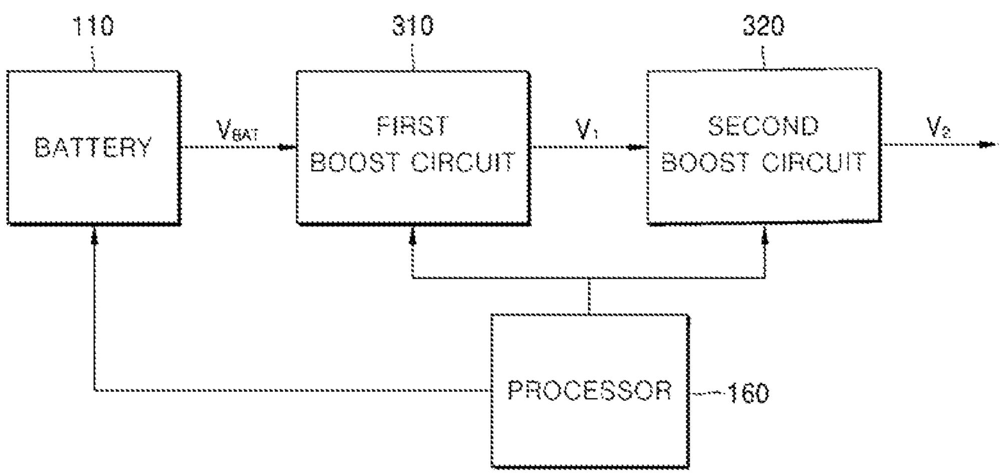
【Figure 4】
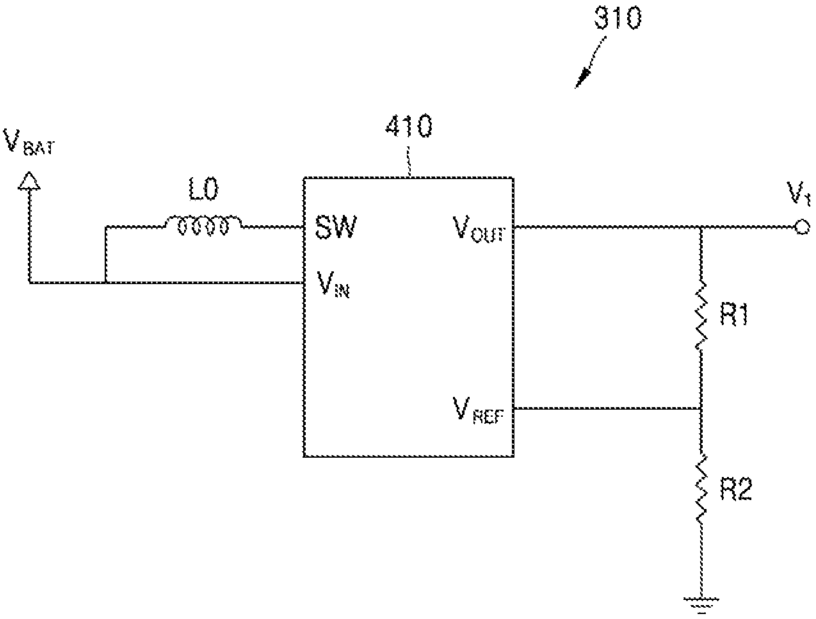

【Figure 5】
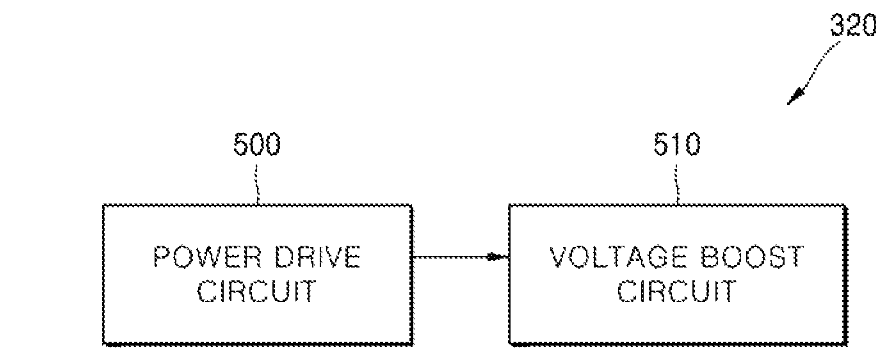
【Figure 6】
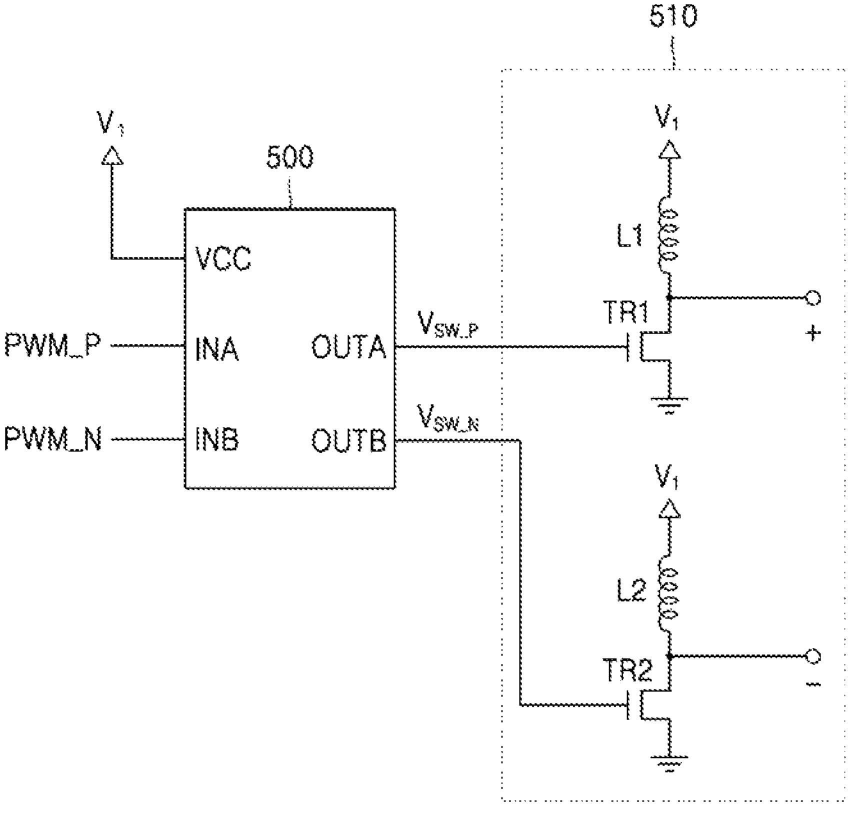

【Figure 7】
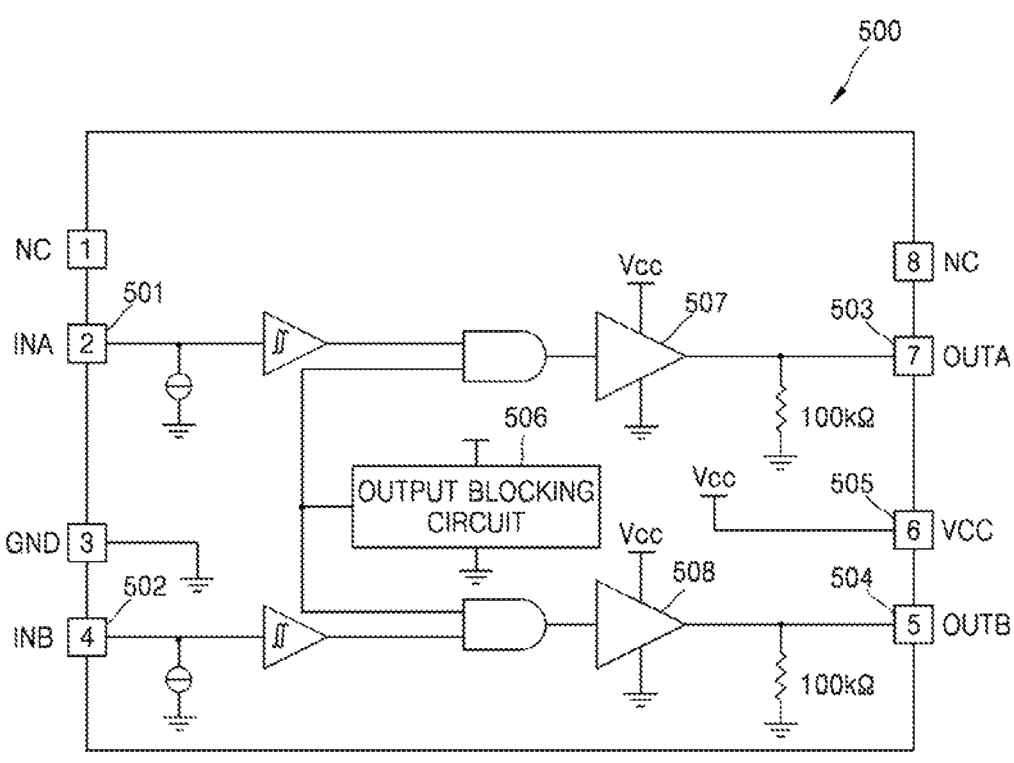

【Figure 8】
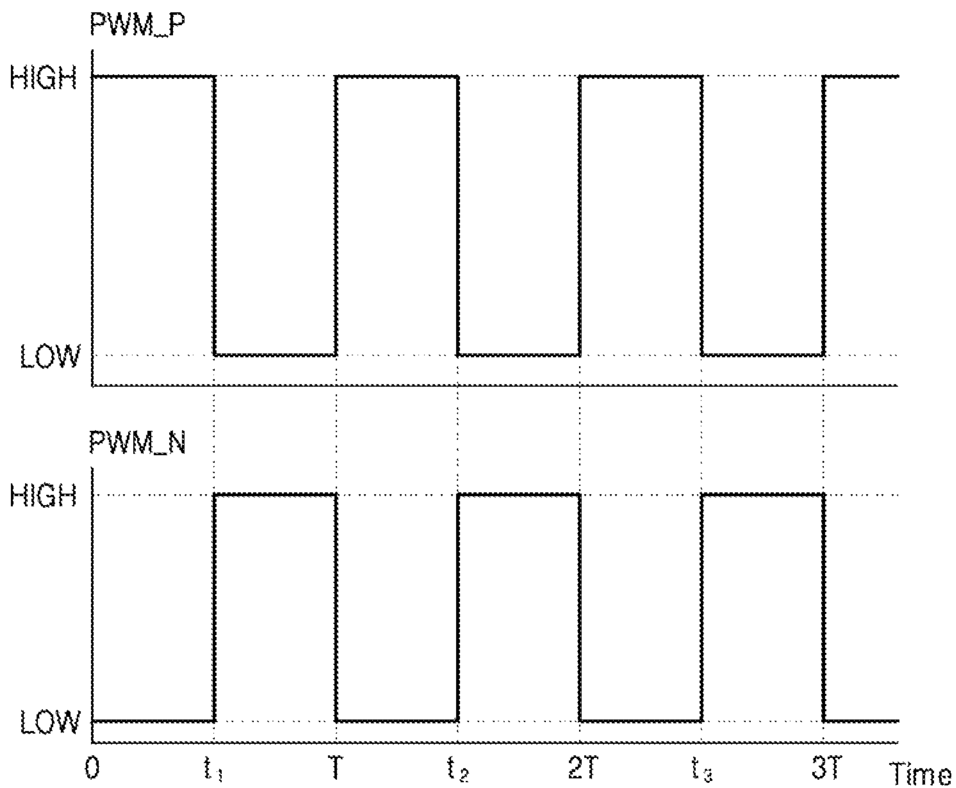

【Figure 9】
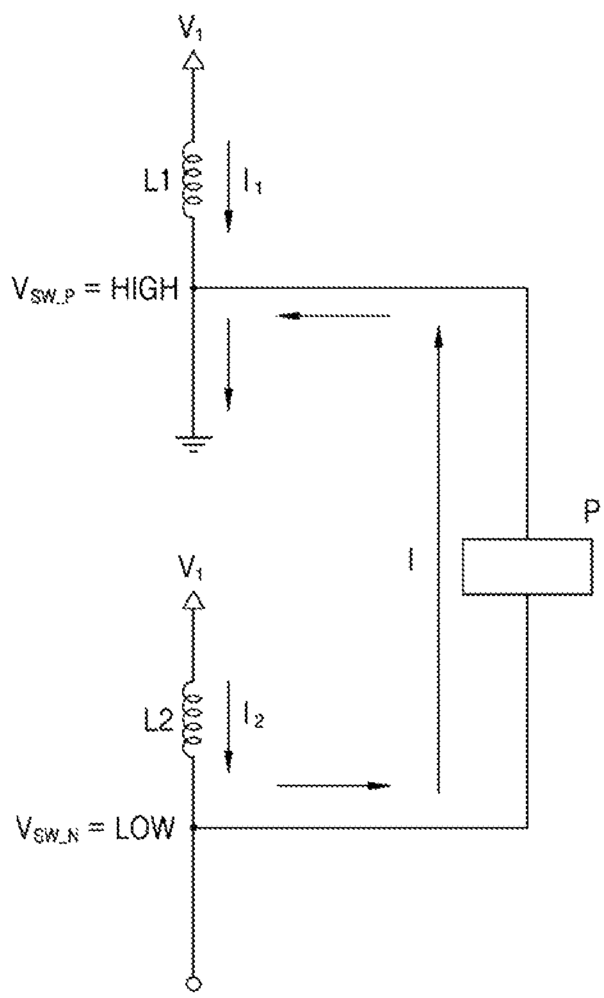

【Figure 10】
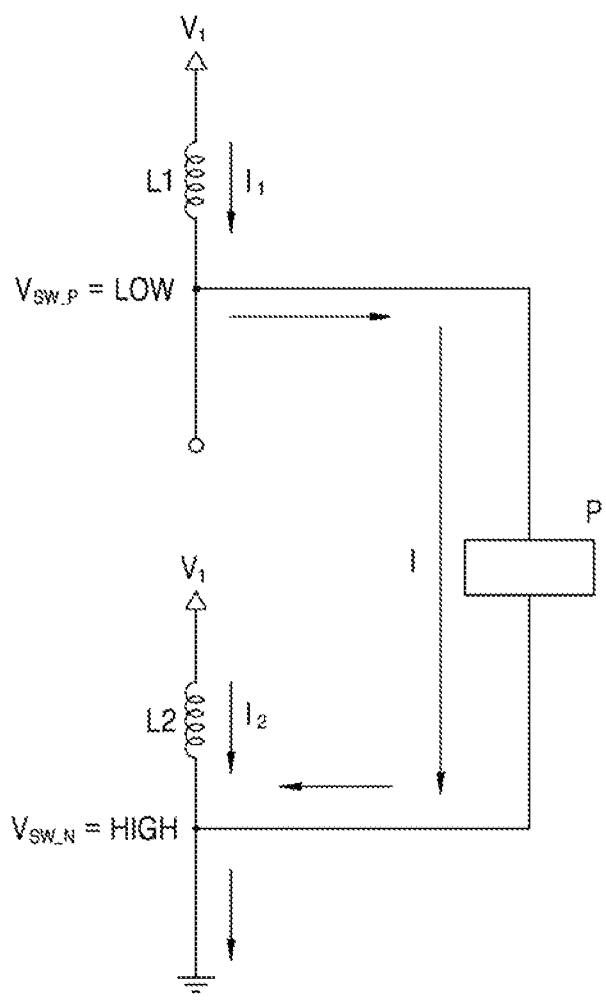

【Figure 11】
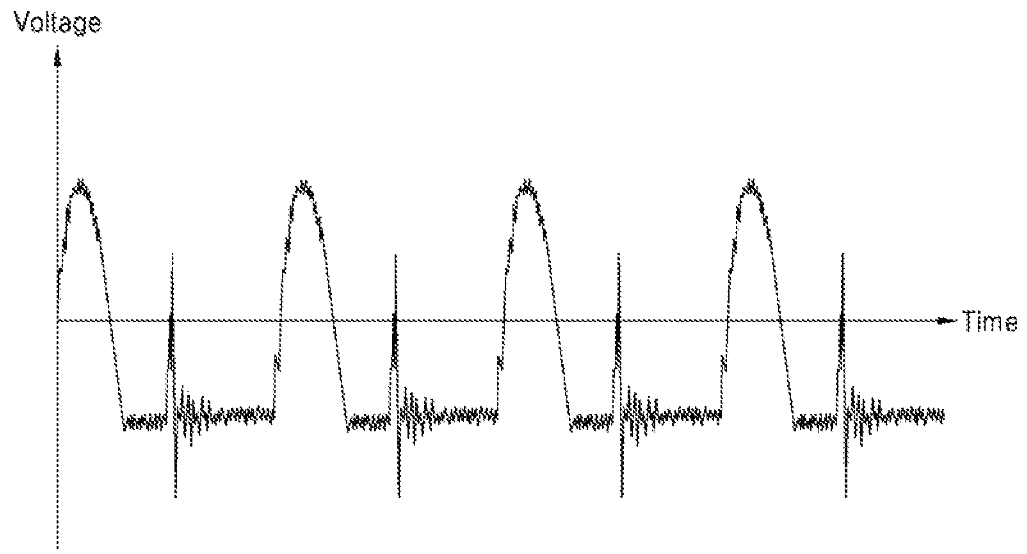
【Figure 12】
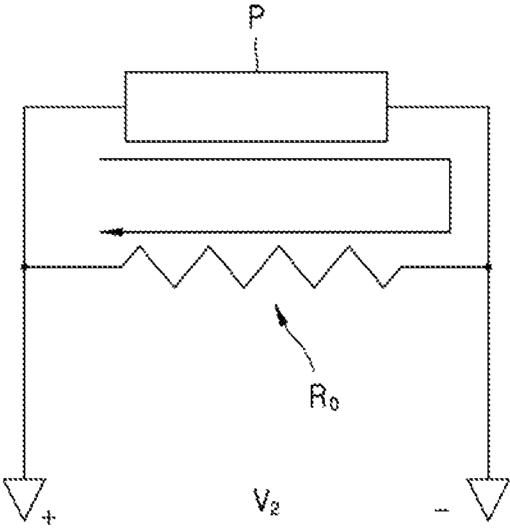

AEROSOL GENERATING DEVICE

CROSS REFERENCE TO RELATED APPLICATIONS

This application is a National Stage of International Application No. PCT/KR2022/010774 filed Jul. 22, 2022, claiming priority based on Korean Patent Application No. 10-2021-0110305 filed Aug. 20, 2021 and Korean Patent Application No. 10-2021-0144965 filed Oct. 27, 2021.

TECHNICAL FIELD

The present disclosure relates to an aerosol generating device.

BACKGROUND ART

There is an increasing demand for an aerosol generating device that generates an aerosol in a non-burning manner as an alternative to a traditional cigarette. For example, an aerosol generating device may generate an aerosol from an aerosol generating material without burning and supply the generated aerosol to a user.

DISCLOSURE

Technical Problem

An aerosol generating device using ultrasonic vibration may generate ultrasonic vibration by applying an alternating current (AC) voltage to a vibrator, and thus an aerosol generating material may be separated into fine particles by the ultrasonic vibration. An aerosol may be generated while the aerosol generating material is separated into fine particles that are released. In addition, in order for a vibrator to be driven stably and efficiently, an AC voltage (e.g., about 55 V to about 70 V) which is higher than a battery voltage (e.g., about 3.4 V to about 4.2 V) of an aerosol generating device has to be applied to the vibrator. Accordingly, there is demand for a technology to apply an AC voltage having a high voltage value to the vibrator without excessively increasing the size and power consumption of entire circuits.

Various embodiments provide an aerosol generating device. Technical problems to be solved by the present disclosure are not limited to the technical problems described above, and other technical problems may be inferred from the following embodiments.

Technical Solution

An aerosol generating device according to an embodiment includes a battery configured to supply a battery voltage, a first boost circuit configured to boost the battery voltage to a first boost voltage higher than the battery voltage, a second boost circuit configured to generate first and second switching voltages respectively based on first and second PWM signals, and boost the first boost voltage to a second boost voltage according to the generated first and second switching voltages, a vibrator configured to generate ultrasonic vibration according to the second boost voltage, and atomize an aerosol generating material, and a processor configured to control the battery, the first boost circuit, and the second boost circuit.

The second boost circuit may include a power drive circuit configured to generate the first and second switching voltages respectively based on the first and second PWM signals input from the processor, and a voltage boost circuit configured to boost the first boost voltage to the second boost voltage according to the first and second switching voltages output from the power drive circuit.

The boost circuit may include a first inductor having one terminal to which the first boost voltage is applied and another terminal connected to one terminal of the vibrator, a first transistor connected to another terminal of the first inductor and configured to switch a current flowing between the first inductor and a ground according to the first switching voltage, a second inductor having one terminal to which the first boost voltage is applied and another terminal connected to another terminal of the vibrator, and a second transistor connected to the other terminal of the second inductor and configured to switch a current flowing between the second inductor and the ground according to the second switching voltage.

The power drive circuit may further include an output blocking circuit configured to block an output of the power drive circuit when any one of the first and second switching voltages is less than or equal to a threshold voltage.

The power drive circuit may be implemented as one integrated circuit.

The first boost voltage may be at least three times greater than the battery voltage, and the second boost voltage may be at least four times greater than the first boost voltage.

The battery voltage and the first boost voltage may be direct current (DC) voltages, and the second boost voltage may be an alternating current (AC) voltage.

The first boost circuit may include a DC-DC converter including an input terminal to which the battery voltage is applied, a switch terminal connected to the input terminal through a power inductor, a reference voltage terminal, and an output terminal for outputting the first boost voltage, a first resistor having one terminal connected to the output terminal and another terminal connected to the reference voltage terminal, and a second resistor having one terminal connected to the reference voltage terminal and another terminal connected to a ground.

The DC-DC converter may be configured to output the first boost voltage based on a ratio of the first resistor to the second resistor.

The first transistor may include a semiconductor switch configured to switch a current flowing between a source electrode of the first transistor connected to ground and a drain electrode of the first transistor connected to the other terminal of the first inductor, according to levels of the first switching voltage applied to a gate electrode of the first transistor, and the second transistor may include another semiconductor switch configured to switch a current flowing between a source electrode of the second transistor connected to the ground and a drain electrode of the second transistor connected to the other terminal of the second inductor, according to the second switching voltage applied to a gate electrode of the second transistor.

The first PWM signal and the second PWM signal may be complementary to each other.

When the first switching voltage is at a first level and the second switching voltage is at a second level, a current flows between one of the first and second inductors and the ground such that energy corresponding to a change in current flowing through one of the first and second inductors may be stored in the one of the first and second inductors, and a current does not flow between the other of the first and second inductors and the ground such that energy stored in the other of the first and second inductors may be transmitted to the vibrator.

Advantageous Effects

The present disclosure provides an aerosol generating device. Specifically, an aerosol generating device according to an embodiment of the present disclosure may boost a battery voltage to a first boost voltage by using a first boost circuit and boost the first boost voltage to a second boost voltage by using a second boost circuit and apply the second boost voltage to a vibrator. The first boost circuit may include a DC-DC converter circuit that primarily boosts the battery voltage by only an appropriate boost ratio in order not to excessively increase a size of the first boost circuit. In addition, the second boost circuit may convert a DC voltage into an AC voltage by using counter electromotive force of an inductor and a switching circuit and obtain a secondary voltage boosting effect, and by implementing a power drive circuit for switching two power semiconductor switches providing AC boost power as one integrated circuit, the number of required components may be reduced and a size of a PCB circuit may be reduced.

Therefore, according to an embodiment of the present disclosure, an AC voltage having a high voltage value may be applied to a vibrator without excessively increasing a size and power consumption of a circuit, compared to a case in which a plurality of DC-DC converter circuits are combined in a cascade manner or a converter circuit capable of boosting a voltage at a boost rate of 10 times or more at a time is used.

DESCRIPTION OF DRAWINGS

FIG. 1 is a block diagram of an aerosol generating device according to an embodiment.

FIG. 2 is a view schematically illustrating the aerosol generating device according to an embodiment.

FIG. 3 is a diagram illustrating a hardware configuration of an aerosol generating device according to an embodiment.

FIG. 4 is a circuit diagram illustrating a first boost circuit according to an embodiment.

FIG. 5 is a schematic diagram of a second boost circuit according to an embodiment:

FIG. 6 is a detailed circuit diagram of the second boost circuit illustrated in FIG. 5.

FIG. 7 is a detailed circuit diagram of a power drive circuit illustrated in FIG. 6.

FIG. 8 is a diagram illustrating pulse width modulation (PWM) signals according to an embodiment.

FIGS. 9 and 10 are diagrams illustrating an operation of a second boost circuit according to an embodiment.

FIG. 11 is a graph illustrating a change in voltage applied to a vibrator according to an embodiment.

FIG. 12 is a diagram illustrating a circuit configuration of a cartridge according to an embodiment.

MODE FOR INVENTION

With respect to the terms used to describe in the various embodiments, the general terms which are currently and widely used are selected in consideration of functions of structural elements in the various embodiments of the present disclosure. However, meanings of the terms can be changed according to intention, a judicial precedence, the appearance of a new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The term "aerosol" described in the specification means a gas in a state in which vaporized particles generated from aerosol generating material and air are mixed. In addition, the term "aerosol generating device" described in the specification means device that generates the aerosol by using the aerosol generating material to generate the aerosol that can be inhaled directly into a user's lungs through the user's mouth.

The term "puff" described in the specification means inhalation by the user, and inhalation means a situation in which the aerosol is drawn into the user's mouth, nasal cavity, or lungs through the user's mouth or nose. Hereinafter, the present disclosure will now be described more fully with reference to the accompanying drawings, in which exemplary embodiments of the present disclosure are shown such that one of ordinary skill in the art may easily work the present disclosure.

FIG. 1 is a block diagram of an aerosol generating device according to an embodiment.

Referring to FIG. 1, the aerosol generating device 10 may include a battery 110, an atomizer 120, a sensor 130, a user interface 140, a memory 150, and a processor 160. However, an internal structure of the aerosol generating device 10 is not limited to the structure illustrated in FIG. 1. Those skilled in the art related to the present embodiment may be understand that some of the hardware components illustrated in FIG. 1 may be omitted or a new configuration may be further added thereto according to a design of the aerosol generating device 10.

For example, the aerosol generating device 10 may include a main body, and in this case, hardware components included in the aerosol generating device 10 may be located on the main body.

In another embodiment, the aerosol generating device 10 may include a main body and a cartridge, and hardware components included in the aerosol generating device 10 may be located distributively in from the main body and the cartridge. Alternatively, at least some of the hardware components included in the aerosol generating device 10 may be located in each of the main body and the cartridge.

Hereinafter, operations of respective components are described without limiting positions of the respective components included in the aerosol generating device 10.

The battery 110 supplies power used to operate the aerosol generating device 10. For example, the battery 110 may supply power to enable the atomizer 120 to atomize an aerosol generating material. In addition, the battery 110 may supply power required for operations of other hardware components, which are included in the aerosol generating device 10, for example, the sensor 130, the user interface 140, the memory 150, and the processor 160. The battery 110 may be a rechargeable battery or a disposable battery.

For example, the battery 110 may include a nickel-based battery (for example, a nickel-metal hydride battery or a nickel-cadmium battery), or a lithium-based battery (for example, a lithium-cobalt battery, a lithium-phosphate battery, a lithium titanate battery, a lithium-ion battery, or a lithium-polymer battery). However, the type of the battery 110 that may be used in the aerosol generating device 10 is not limited to the batteries described above. If necessary, the battery 110 may also include an alkaline battery or a manganese battery.

The atomizer 120 may receive power from the battery 110 under the control of the processor 160. The atomizer 120 may receive power from the battery 110 to atomize an aerosol generating material stored in the aerosol generating device 10.

The atomizer 120 may be located in the main body of the aerosol generating device 10. Alternatively, when the aerosol generating device 10 includes a main body and a cartridge, the atomizer 120 may be located in the cartridge or may be divided to be located in the main body and the cartridge. When the atomizer 120 is located in the cartridge, the atomizer 120 may receive power from the battery 110 located in at least one of the main body and the cartridge. In addition, when the atomizer 120 is divided to be separately located in the main body and the cartridge, components of the atomizer 120 which require power may receive the power from the battery 110 located in at least one of the main body and the cartridge.

The atomizer 120 generates an aerosol from an aerosol generating material in the cartridge. An aerosol indicates floating particles in which liquid and/or solid fine particles are dispersed in a gas. Accordingly, an aerosol generated from the atomizer 120 may indicate a mixture of vaporized particles generated from an aerosol generating material and air. For example, the atomizer 120 may convert a phase of the aerosol generating material into a gas phase through vaporization and/or sublimation. In addition, the atomizer 120 may generate an aerosol by changing the aerosol generating material in a liquid phase and/or a solid phase into fine particles.

For example, the atomizer 120 may generate an aerosol from an aerosol generating material through an ultrasonic vibration method. The ultrasonic vibration method may refer to a method of generating an aerosol by atomizing an aerosol generating material by using ultrasonic vibration generated by a vibrator (e.g., a kind of a transducer).

Although not illustrated in FIG. 1, the atomizer 120 may optionally include a heater capable of heating an aerosol generating material by generating heat. An aerosol generating material may be heated by a heater to generate an aerosol.

The heater may be formed of any suitable electrically resistive material. For example, the suitable electrically resistive material may be a metal or a metal alloy including titanium, zirconium, tantalum, platinum, nickel, cobalt, chromium, hafnium, niobium, molybdenum, tungsten, tin, gallium, manganese, iron, copper, stainless steel, or nichrome, but is not limited thereto. In addition, the heater may be composed of a metal heating wire, a metal heating plate on which an electrically conductive track is arranged, a ceramic heating element, or so on but is not limited thereto.

For example, in one embodiment, the heater may be a portion of the cartridge. In addition, the cartridge may include a liquid delivery means and a reservoir, which are described below. An aerosol generating material included in the reservoir may be moved to the liquid delivery means, and the heater may heat the aerosol generating material absorbed in the liquid delivery means to generate an aerosol. For example, the heater may be wound around the liquid delivery means or may be arranged adjacent to the liquid delivery means.

In another example, the aerosol generating device 10 may include an accommodation space capable of accommodating a cigarette, and a heater may heat a cigarette inserted in the accommodation space of the aerosol generating device 10. As a cigarette is accommodated in the accommodation space of the aerosol generating device 10, a heater may be located inside and/or outside the cigarette. Accordingly, the heater may heat an aerosol generating material in the cigarette to generate an aerosol.

In addition, the heater may include an induction heating type heater. The heater may include an electrically conductive coil for inducing an alternating magnetic field, and the cigarette or cartridge may include a susceptor capable of being heated by the alternating magnetic field.

The aerosol generating device 10 may include at least one sensor 130. A sensing result obtained by the at least one sensor 130 may be transmitted to the processor 160, and the processor 160 may control the aerosol generating device 10 to perform various functions such as an operation control of the atomizer 120, restriction of smoking, determination of whether or not a cartridge (or a cigarette) is inserted, and notification display, according to the sensing result.

For example, the at least one sensor 130 may include a puff detection sensor. The puff detection sensor may detect a puff of a user based on at least one of a change in a flow rate of an externally introduced airflow, a change in pressure, and detection of sound. The puff detection sensor may detect a start time and an end time of the puff of the user, and the processor 160 may determine a puff period and a non-puff period according to the detected puff start time and the detected puff end time.

In addition, the at least one sensor 130 may include a user input sensor. The user input sensor may include a sensor capable of receiving a user input, such as a switch, a physical button, or a touch sensor. For example, the touch sensor may include a capacitive sensor capable of detecting a user input by detecting a change in capacitance occurring when a user touches a certain region formed of a metal material. The processor 160 may determine whether a user input is made based on the change in capacitance detected by the capacitive sensor. When the change in capacitance exceeds a preset threshold, the processor 160 may determine that the user input has been made.

In addition, the at least one sensor 130 may include a motion sensor. Information on a movement of the aerosol generating device 10, such as inclination, movement speed, and acceleration of the aerosol generating device 10 may be acquired by the motion sensor. For example, the motion sensor may acquire information on a state in which the aerosol generating device 10 moves, a stationary state of the aerosol generating device 10, a state in which the aerosol generating device 10 is inclined at an angle within a predetermined range for puff, and a state in which the aerosol generating device 10 is inclined at an angle different from the angle during a puff operation between respective puff operations. The motion sensor may measure motion information of the aerosol generating device 10 through various methods known in the art. For example, the motion sensor may include an acceleration sensor capable of measuring acceleration in three directions of an x-axis, a y-axis, and a z-axis, and a gyro sensor capable of measuring angular velocity in three directions.

In addition, the at least one sensor 130 may include a proximity sensor. The proximity sensor refers to a sensor that detects presence of an approaching object, an object in the proximity or a distance from the object by using an electromagnetic field, infrared rays, or so on without mechanical contact. Thus, the proximity sensor may detect a user approaching the aerosol generating device 10.

In addition, the at least one sensor 130 may include an image sensor. The image sensor may include, for example, a camera for acquiring an image of an object. The image sensor may recognize an object based on an image acquired by the camera. The processor 160 may analyze the image acquired by the image sensor to determine whether a user is in a situation for using the aerosol generating device 10. For example, when a user brings the aerosol generating device 10 close to the lip to use the aerosol generating device 10, the image sensor may acquire an image of the lip. The processor 160 may analyze the acquired image, and when it is determined that the image is the lip, the processor 160 determines that the user is in a situation for using the aerosol generating device 10. The aerosol generating device 10 may operate the atomizer 120 in advance or preheat the heater.

In addition, the at least one sensor 130 may include a consumable detachment sensor capable of detecting installation or removal of a consumable (for example, a cartridge, a cigarette, or so on) that may be used in the aerosol generating device 10. For example, the consumable detachment sensor may detect whether the consumable is in contact with the aerosol generating device 10 or may determine whether the consumable is removed by the image sensor. In addition, the consumable detachment sensor may include an inductance sensor for detecting a change in inductance value of a coil that may interact with a marker of the consumable, or a capacitance sensor for detecting a change in capacitance value of a capacitor that may interact with the marker of the consumable.

In addition, the at least one sensor 130 may include a temperature sensor. The temperature sensor may detect a temperature of a vibrator or a heater (or an aerosol generating material) of the atomizer 120. The aerosol generating device 10 may include a separate temperature sensor for detecting a temperature of the vibrator or the heater, or the heater itself may serve as a temperature sensor instead of including the separate temperature sensor. Alternatively, the separate temperature sensor may be further included in the aerosol generating device 10 while the heater functions as a temperature sensor. In addition, the temperature sensor may also detect temperatures of internal components such as a printed circuit board (PCB) and a battery of the aerosol generating device 10 as well as a temperature of a vibrator or a heater.

In addition, the at least one sensor 130 may include various sensors that acquire information on a surrounding environment of the aerosol generating device 10. For example, the at least one sensor 130 may include a temperature sensor for detecting a temperature of a surrounding environment, a humidity sensor for detecting humidity of the surrounding environment, an atmospheric pressure sensor for detecting a pressure of the surrounding environment, and so on.

The sensor 130 that may be provided in the aerosol generating device 10 is not limited to the sensors described above and may further include various sensors. For example, the aerosol generating device 10 may include a fingerprint sensor for acquiring fingerprint information from a user's finger for user authentication and security, an iris recognition sensor for analyzing an iris pattern of the pupil, a vein recognition sensor for detecting the amount of infrared absorption of reduced hemoglobin in vein from an image obtained by capturing the palm, a facial recognition sensor for recognizing feature points of eyes, a nose, a mouth, a facial contour, and so on through a two-dimensional (2D) or three-dimensional (3D) method, a radio-frequency identification (RFID) sensor, and so on.

The aerosol generating device 10 may selectively include only some of the examples of the various sensors 130 described above. In other words, the aerosol generating device 10 may combine pieces of information acquired by at least one sensor among the sensors described above.

The user interface 140 may provide information on a state of the aerosol generating device 10 to a user. The user interface 140 may include various interfacing means such as a display or a lamp for outputting visual information, a motor for outputting tactile information, a speaker for outputting sound information, terminals for data communication with input/output (I/O) interfacing means (for example, buttons or a touch screen) for receiving information input from a user or outputting information to the user or for receiving charging power, and a communication interface for performing wireless communication (for example, WI-FI, WI-FI Direct, Bluetooth, near-field communication (NFC), and so on) with an external device.

However, the aerosol generating device 10 may optionally include only some of the various examples of the user interface 140 described above.

The memory 150 may store various data processed by the aerosol generating device 10, data processed by the processor 160, and data to be processed by the processor 160. The memory 150 includes various memory devices, for example, random access memory (RAM) such as dynamic random access memory (DRAM) or static random access memory (SRAM), read-only memory (ROM), electrically erasable programmable read-only memory (EEPROM), and so on.

The memory 150 may store operation time of the aerosol generating device 10, the greatest number of puffs, the current number of puffs, at least one temperature profile, data on a user's smoking pattern, and so on.

The processor 160 controls all operations of the aerosol generating device 10. The processor 160 may be implemented by an array of a plurality of logic gates or may be implemented by a combination of a microprocessor and a memory in which a program executable by the microprocessor is stored. In addition, it can be understood by those skilled in the art that the processor 160 may also be implemented by other types of hardware.

The processor 160 analyzes sensing results of the at least one sensor 130 and controls a process to be subsequently performed. For example, the processor 160 may control power supplied to the atomizer 120 to start or end an operation of the atomizer 120 based on the sensing result of the at least one sensor 130. In addition, the processor 160 may control the amount of power supplied to the atomizer 120 and a power supply time such that the atomizer 120 may generate an appropriate amount of aerosol based on the sensing results of the at least one sensor 130. For example, the processor 160 may control a current or a voltage supplied to the vibrator such that the vibrator of the atomizer 120 vibrates at a preset frequency.

In one embodiment, the processor 160 may initiate an operation of the atomizer 120 after receiving a user input for the aerosol generating device 10. In addition, the processor 160 may start the operation of the atomizer 120 when a puff of a user is detected by the puff detection sensor. In addition, the processor 160 may stop supplying power to the atomizer 120 when the number of puffs reaches a preset number after counting the number of puffs with the puff detection sensor.

The processor 160 may control the user interface 140 based on the sensing results of the at least one sensor 130. For example, when the number of puffs reaches a preset number after counting the number of puffs with the puff detection sensor, the processor 160 may notify a user that the aerosol generating device 10 will end soon with at least one of a lamp, a motor, and a speaker.

In addition, although not illustrated in FIG. 1, the aerosol generating device 10 may be combined with a separate cradle with an aerosol generating system. For example, the cradle may be used to charge the battery 110 of the aerosol generating device 10. For example, the aerosol generating device 10 may receive power from a battery of the cradle to charge the battery 110 of the aerosol generating device 10 while being accommodated in an accommodation space in the cradle.

One embodiment may also be implemented in the form of a computer-readable medium including instructions executable by a computer, such as a program module executable by the computer. The computer-readable medium may be any available medium that can be accessed by a computer and includes both volatile and nonvolatile media, and removable and non-removable media. In addition, the computer-readable medium may include both a computer storage medium and a communication medium. The computer storage medium includes all of volatile and nonvolatile, and removable and non-removable media implemented by any method or technology for storage of information such as computer-readable instructions, data structures, program modules or other data. The communication medium typically includes computer-readable instructions, data structures, other data in modulated data signals such as program modules, or other transmission mechanisms, and includes any information transfer media.

FIG. 2 is a diagram schematically illustrating an aerosol generating device according to an embodiment.

The aerosol generating device 10 according to the embodiment illustrated in FIG. 2 includes a cartridge 20 including an aerosol generating material, and a main body 25 supporting the cartridge 20.

The cartridge 20 may be coupled to the main body 25 in a state in which the aerosol generating material is accommodated therein. For example, the cartridge 20 may be coupled to the main body 25 by inserting at least a part of the cartridge 20 into the main body 25. In another example, the cartridge 20 may be coupled to the main body 25 by inserting at least a part of the main body 25 into the cartridge 20.

The cartridge 20 may be coupled to the main body 25 through at least one of a snap-fit method, a screw coupling method, a magnetic coupling method, and a press-fit method, but a coupling method of the cartridge 20 and the main body 25 is not limited to the examples described above.

In one embodiment, the cartridge 20 may include a mouthpiece 210 that is inserted into a user's mouth during inhalation of the user. In one embodiment, the mouthpiece 210 may be located at an end portion, and the opposite end portion may be coupled to the main body 25 of the cartridge 20. The mouthpiece 210 may include an outlet **210*e*** for discharging an aerosol generated from the aerosol generating material to the outside.

A pressure difference may occur between the outside and the inside of the cartridge 20 due to a user's inhalation or puff, and the aerosol generated inside the cartridge 20 may be discharged to the outside of the cartridge 20 through the outlet **210*e* due to a pressure difference between the inside and the outside of the cartridge 20. The user may receive the aerosol discharged to the outside of the cartridge 20 through the outlet 210*e* by inhaling the aerosol through the mouthpiece 210**.

In one embodiment, the cartridge 20 may include a reservoir 220 that is located in an interior space of a housing 200 to accommodate an aerosol generating material. That is, the reservoir 220 may serve as a container to directly store an aerosol generating material. Alternatively, the reservoir 220 may include elements containing an aerosol generating material, such as sponge, cotton, cloth, or a porous ceramic structure.

The cartridge 20 may contain an aerosol generating material in any one of, for example, a liquid state, a solid state, a gaseous state, or a gel state. The aerosol generating material may include a liquid composition. For example, the liquid composition may include a liquid including a tobacco-containing material, a liquid including volatile tobacco flavor ingredients, and/or a liquid including a non-tobacco material.

For example, the liquid composition may include one component of water, solvents, ethanol, plant extracts, spice, flavoring, and vitamin mixtures, or a mixture of these components. The spice may include menthol, peppermint, spearmint oil, and various fruit flavoring ingredients but are not limited thereto. The flavoring may include ingredients capable of providing a user with a variety of savor or flavor. Vitamin mixtures may be a mixture of at least one of vitamin A, vitamin B, vitamin C, and vitamin E, but are not limited thereto. In addition, the liquid composition may include aerosol formers such as glycerin and propylene glycol.

For example, the liquid composition may include a glycerin and propylene glycol solution to which nicotine salts are added. The liquid composition may include two or more types of nicotine salts. Nicotine salts may be formed by adding suitable acids, including organic or inorganic acids, to nicotine. Nicotine may be a naturally generated nicotine or synthetic nicotine and may have any suitable weight concentration relative to the total solution weight of the liquid composition.

Acid for forming the nicotine salts may be appropriately selected in consideration of a blood nicotine absorption rate, an operating temperature of the aerosol generating device 10, savor or flavor, solubility, and so on. For example, the acid for the formation of nicotine salts may be a single acid selected from the group consisting of benzoic acid, lactic acid, salicylic acid, lauric acid, sorbic acid, levulinic acid, pyruvic acid, formic acid, acetic acid, propionic acid, butyric acid, valeric acid, caproic acid, caprylic acid, capric acid, citric acid, myristic acid, palmitic acid, stearic acid, oleic acid, linoleic acid, linolenic acid, phenylacetic acid, tartaric acid, succinic acid, fumaric acid, gluconic acid, saccharic acid, malonic acid or malic acid, or a mixture of two or more acids selected from the group, but is not limited thereto.

The aerosol generating device 10 may include the atomizer 120 that converts a phase of an aerosol generating material in the cartridge 20 to generate an aerosol.

*84 In one example, the aerosol generating material stored or accommodated in the reservoir 220 may be supplied to the atomizer 120 by a liquid delivery means 230, and the atomizer 120 may atomize the aerosol generating material supplied from the liquid delivery means 230, thereby generating an aerosol. The liquid delivery means 230 may be, for example, a wick including at least one of cotton fiber, ceramic fiber, glass fiber, and porous ceramic but is not limited thereto.

According to one embodiment, the atomizer 120 of the aerosol generating device 10 may convert a phase of an aerosol generating material through an ultrasonic vibration method of atomizing the aerosol generating material by using ultrasonic vibration.

For example, the atomizer 120 may include a vibrator that generates a vibration of a short cycle, and the vibration generated by the vibrator may be ultrasonic vibration. The frequency of the ultrasonic vibration may be about 100 kHz to about 3.5 MHz but is not limited thereto. The aerosol generating material supplied from the reservoir 220 to the atomizer 120 may be vaporized and/or made to particles by the vibration of a short cycle generated by the vibrator to be atomized into an aerosol.

The vibrator may include, for example, a piezoelectric ceramic, which may be a functional material capable of converting an electrical force to a mechanical force and vice versa by generating electricity (e.g., a voltage) in response to a physical force (e.g., a pressure) and generating a vibration (i.e., a mechanical force) in response to electricity. As power is applied to a vibrator, a vibration (i.e., a physical force) of a short cycle may be generated, and the generated vibration may break an aerosol generating material into small particles, thereby generating an aerosol.

The vibrator may be electrically connected to other components of the aerosol generating device 10 through an electrical connection member. For example, the vibrator may be electrically connected to at least one of the battery 110 and the processor 160 of the aerosol generating device 10, or a circuit of the aerosol generating device 10 through an electrical connection member, but components electrically connected to the vibrator are not limited to the examples described above.

The vibrator may receive a current or a voltage from the battery 110 through an electrical connection member to generate ultrasonic vibration, or an operation thereof may be controlled by the processor 160.

The electrical connection member may include at least one of, for example, a pogo pin and a C-clip, but the electrical connection member is not limited to the examples described above. In another example, the electrical connection member may include at least one of a cable and a flexible printed circuit board (FPCB).

In another embodiment (not illustrated), atomizer 120 may include a vibration receiver of a mesh shape or a plate shape which performs both a function of maintaining the best condition for absorbing an aerosol generating material without using a separate liquid delivery means 230 to convert the aerosol generating material into an aerosol and a function of transferring a vibration to the aerosol generating material to generate an aerosol.

Although FIG. 2 shows that the liquid delivery means 230 and the atomizer 120 are arranged in the cartridge 20, the present disclosure is not limited thereto. In another embodiment, the liquid delivery means 230 may be in the cartridge 20, and the atomizer 120 may be in the main body 25.

The cartridge 20 of the aerosol generating device 10 may include an outlet passage 240. The outlet passage 240 is formed inside the cartridge 20 and may be in fluid communication with the atomizer 120 and the outlet 210*e* of the mouthpiece 210. Accordingly, an aerosol generated by the atomizer 120 may flow through the outlet passage 240 and may be discharged to the outside of the aerosol generating device 10 through the outlet 210*e* to be delivered to a user.

For example, the outlet passage 240 may be provided in the inside of the cartridge 20 to be surrounded by the reservoir 220 but is not limited thereto.

Although not illustrated in the drawings, the cartridge 20 of the aerosol generating device 10 may include at least one air inlet passage through which air (hereinafter, "external air") outside the aerosol generating device 10 flows into the aerosol generating device 10.

The external air may be introduced into the outlet passage 240 or a space where an aerosol is generated by the atomizer 120 through at least one air inlet passage. The introduced external air may be mixed with vaporized particles generated from an aerosol generating material, and thus, an aerosol is generated.

A cross section perpendicular to a longitudinal direction (i.e., lengthwise direction) of the cartridge 20 and the main body 25 may have a different shape according to embodiments, such as a circular shape, an oval shape, a square shape, a rectangular shape, and a polygonal shape. However, a cross-sectional shape of the aerosol generating device 10 is not limited to the shapes described above. Also, the present disclosure is not limited to a linearly extending structure when the aerosol generating device 10.

In another embodiment, the aerosol generating device 10 may be curved in a streamline shape for a user to easily hold the aerosol generating device 10 by hand or may be bent at a preset angle in a certain region. Also, the cross-sectional shape of the aerosol generating device 10 may vary along the longitudinal direction.

FIG. 3 is a diagram illustrating a hardware configuration of an aerosol generating device according to an embodiment.

Referring to FIG. 3, an aerosol generating device (for example, the aerosol generating device 10 of FIG. 1 or 2) may further include a first boost circuit 310 and a second boost circuit 320 in addition to the battery 110 and processor 160.

In embodiments of FIG. 3 and the drawings to be described below, the processor 160, the first boost circuit 310, and the second boost circuit 320 are illustrated as separate components for the sake of convenient description, but implementation of the present embodiments is not limited thereto. In other words, at least one of the first boost circuit 310 and the second boost circuit 320 may be included in the processor 160. In addition, each of the first boost circuit 310 and the second boost circuit 320 may be arranged in a main body (for example, the main body 25 of FIG. 2) or a cartridge (for example, the cartridge 20 of FIG. 2) of the aerosol generating device. Such modifications should be interpreted as being within the scope of the present embodiments.

The battery 110 may supply a battery voltage $V_{BAT}$ having a first voltage value. The first voltage value may be in a range of about 3.4 V to about 4.2 V but is not limited thereto. The first voltage value may be in a range of about 3.8 V to about 6 V and may also be in a range of about 2.5 V to about 3.6 V. A size of the aerosol generating device may be limited for portability, and a size of the battery 110 included in the aerosol generating device may also be limited. Accordingly, the first voltage value of the battery voltage $V_{BAT}$ supplied by the battery 110 may not be sufficient to stably and efficiently drive a vibrator, and boosting of the battery voltage $V_{BAT}$ may be required.

The first boost circuit 310 may boost the battery voltage $V_{BAT}$ to a first boost voltage $V_1$ having a second voltage value higher than the first voltage value. The battery voltage $V_{BAT}$ and the first boost voltage $V_1$ may be a direct current (DC) voltage. The second voltage value may be in a range of about 10 V to about 13 V but is not limited thereto. The second voltage value may be in a range of about 7 V to about 10.5 V and may also be in a range of about 12 V to about 20 V. In one example, the second voltage value may be at least three times greater than the first voltage value that is the battery voltage $V_{BAT}$. However, the second voltage value is not limited thereto. Hereinafter, the first boost circuit 310 will be described in more detail with reference to FIG. 4.

FIG. 4 is a circuit diagram illustrating a first boost circuit according to an embodiment.

Referring to FIG. 4, the first boost circuit 310 may include a DC-DC converter 410 including an input terminal $V_{IN}$ to which the battery voltage $V_{BAT}$ is applied, a switch terminal SW connected to the input terminal $V_{IN}$ through a power inductor L0, a reference voltage terminal $V_{REF}$, and an output terminal $V_{OUT}$ outputting the first boost voltage $V_1$. The reference voltage terminal $V_{REF}$ may represent a reference voltage of the DC-DC converter 410.

In addition, the first boost circuit 310 may include a first resistor R1 having one terminal connected to the output terminal $V_{OUT}$ and the other terminal connected to the reference voltage terminal $V_{REF}$, and a second resistor R2 having one terminal connected to the reference voltage terminal $V_{REF}$ and the other terminal connected to a ground.

The DC-DC converter 410 may output the first boost voltage $V_1$ based on a ratio of the first resistor R1 to the second resistor R2. For example, the DC-DC converter 410 may output the first boost voltage $V_1$ to the output terminal $V_{OUT}$ according to the following Equation 1.

$$V_{OUT} = \frac{R1}{R2} V_{REF} + V_{REF} \quad \text{Equation 1}$$

In one example, assuming that the first resistor R1 is about 510 KW, the second resistor R2 is about 42.5 KW, and a voltage of the reference voltage terminal $V_{REF}$ is about 1 V, when the battery voltage $V_{BAT}$ is applied to the input terminal $V_{IN}$ of the DC-DC converter 410, the DC-DC converter 410 may output the first boost voltage $V_1$ of about 13 V to the output terminal $V_{OUT}$ according to Equation 1.

In this example, when the battery voltage $V_{BAT}$ is about 4.2 V, the first boost circuit 310 may boost the battery voltage $V_{BAT}$ three times or more. In addition, a boost ratio of the first boost circuit 310 may be changed according to a ratio of the first resistor R1 to the second resistor R2. Preferably, the first boost circuit 310 may not have too high a boost ratio. For example, the first boost circuit 310 may boost the battery voltage $V_{BAT}$ by three times to six times. As such, the first boost circuit 310 may boost the battery voltage $V_{BAT}$ by an appropriate boost ratio in order not to excessively increase the entire circuit size.

Referring back to FIG. 3, the second boost circuit 320 may boost the first boost voltage $V_1$ to a second boost voltage $V_2$ having a third voltage value higher than the second voltage value in terms of a peak-to-peak voltage value. The third voltage value may be in a range of about 55 V to about 70 V but is not limited thereto. The third voltage value may be in a range of about 45 V to about 60 V and may also be in a range of about 65 V to about 80 V. In one example, the third voltage value may be at least four times greater than the second voltage value. However, the third voltage value is not limited thereto. Hereinafter, the second boost circuit 320 will be described in more detail with reference to FIG. 5.

FIG. 5 is a schematic diagram of the second boost circuit 320 according to an embodiment:

Referring to FIG. 5, the second boost circuit 320 includes a power drive circuit 500 and a voltage boost circuit 510. The power drive circuit 500 receives a first PWM signal PWM_P and a second PWM signal PWM_N from the processor 160 and generates a first switching voltage Vsw_p and a second switching voltage Vsw_n and transmits the first switching voltage Vsw_p and the second switching voltage Vsw_n to the voltage boost circuit 510.

The voltage boost circuit 510 boosts the first boost voltage $V_1$ output from the first boost circuit 310 to the second boost voltage $V_2$ according to the first switching voltage Vsw_p and the second switching voltage Vsw_n, and applies the second boost voltage $V_2$ to a vibrator. Detailed configuration of the power drive circuit 500 and the voltage boost circuit 510 will be described with reference to FIG. 6.

Referring to FIG. 6, the power drive circuit 500 is illustrated as an integrated circuit (hereinafter, referred to as an IC) including five input/output terminals. Here, only five input/output terminals are illustrated, but this is for the sake of convenience of description, and additional terminals may be further provided to implement additional functions.

The first boost voltage $V_1$ output from the first boost circuit 310 may be applied to a VCC terminal to be used as an internal power supply voltage of the power drive circuit 500.

The first PWM signal PWM_P output from the processor 160 is input to an INA terminal, and the second PWM signal PWM_N is input to an INB terminal. The first PWM signal PWM_P and the second PWM signal PWM_N are complementary pulse signals and have a preset duty ratio. The first PWM signal PWM_P and the second PWM signal PWM_N will be described below with reference to FIG. 8.

The first switching voltage Vsw_p generated based on the first PWM signal PWM_P is output from an OUTA terminal, and the second switching voltage Vsw_n generated based on the second PWM signal PWM_N is output from an OUTB terminal. The first and second switching voltages Vsw_p and Vsw_n are respectively applied to a gate electrode of a first transistor TR1 and a gate electrode of a second transistor TR2 in the voltage boost circuit 510.

The voltage boost circuit 510 includes a first inductor L1, the first transistor TR1, a second inductor L2, and the second transistor TR2.

One terminal of the first inductor L1 is connected to a line of the first boost voltage $V_1$ line, and the other terminal thereof is connected to one terminal of a vibrator.

The first transistor TR1 is connected to the other terminal of the first inductor L1 to switch a current between the first inductor L1 and the ground according to the first switching voltage Vsw_p. The first transistor TR1 may include a semiconductor switch that switches a current between the source electrode connected to the ground and the drain electrode connected to the other terminal of the first inductor L1 according to a level of the first switching voltage Vsw_p applied to the gate electrode. For example, the first transistor TR1 may include an N-channel metal oxide semiconductor field effect transistor (MOSFET). The present disclosure is not limited thereto, and the first transistor TR1 may include a P-channel MOSFET or other types of semiconductor switching devices instead of the N-channel MOSFET.

One terminal of the second inductor L2 is connected to the line of the first boost voltage $V_1$, and the other terminal thereof is connected to the other terminal of the vibrator.

The second transistor TR2 is connected to the other terminal of the second inductor L2 and switches a current between the second inductor L2 and the ground according to the second switching voltage Vsw_n. The second transistor TR2 may include a semiconductor switch that switches a current between the source electrode connected to the ground and the drain electrode connected to the other terminal of the second inductor L2 according to a level of the second switching voltage Vsw_n applied to the gate electrode. For example, the second transistor TR2 may include an N-channel MOSFET. The present disclosure is not limited thereto, and the second transistor TR2 may include a P-channel MOSFET or other types of semiconductor switching devices instead of the N-channel MOSFET.

In addition, as a voltage $V_{GS}$ between the gate electrode and the source electrode of each of the first and second transistors TR1 and TR2 increases, effective resistance $R_{DS(on)}$ may be reduced when a current flows between the source electrodes and the drain electrodes of each of the first and second transistors TR1 and TR2. Because the source electrodes are connected to the ground, the voltages $V_{GS}$ between the gate electrodes and the source electrodes of the first transistor TR1 and the second transistor TR2 may respectively correspond to the first switching voltage Vsw_p and the second switching voltage Vsw_n. In one example, the greatest value of the effective resistance $R_{DS(on)}$ is about 72 mW when the voltage $V_{GS}$ is about 6 V, whereas the greatest value of the effective resistance $R_{DS(on)}$ may be reduced to about 59 mW when the voltage $V_{GS}$ is about 10 V. Accordingly, the power drive circuit 500 may be controlled to increase the first switching voltage Vsw_p and the second switching voltage Vsw_n to about 10 V or more. For example, the first and second PWM signals received from the processor 160 may be amplified to switching voltage signals of 10 V or more through the power drive circuit 500. Accordingly, circuit efficiency may be increased. In addition, the first switching voltage Vsw_p and the second switching voltage Vsw_n may be limited to 20 V or less.

FIG. 7 is a detailed circuit diagram of the power drive circuit 500 illustrated in FIG. 6. FIG. 7 illustrates an internal circuit of the power drive circuit 500 illustrated in FIG. 6 in more detail.

Referring to FIG. 7, the first PWM signal PWM_P is input through an INA terminal 501 and the second PWM signal PWM_N is input through an INB terminal 502. A boosted voltage (i.e., the first boost voltage $V_1$ output from the first boost circuit 310 illustrated in FIG. 3) is input to a VCC terminal 505. A VCC voltage is used as an internal power supply voltage of the power drive circuit 500.

The first PWM signal PWM_P input to an amplifier 507 through an AND gate is amplified by the amplifier 507 and is output from an OUTA terminal 503 as the first switching voltage Vsw_p.

The second PWM signal PWM_N input to an amplifier 508 through another AND gate is amplified by the amplifier 508 and is output from an OUTB terminal 504 as the second switching voltage Vsw_n.

When output voltages of the power drive circuit 500 are insufficient (i.e., when the first and second switching voltages Vsw_p and Vsw_n are low), an output blocking circuit 506 performs a function of blocking an output. When a power switch is turned on halfway by an insufficient gate-source voltage, a turn-on resistance thereof increases. When a current flows across a high resistance, significant heat is generated in the power switch. When this state lasts even a few seconds, a temperature rises rapidly to lead to a short circuit if the temperature reaches a critical point. As a result, an overcurrent may flow or the power switch may be destroyed. In this regard, when the voltage $V_{GS}$ between the gate electrode and the source electrode of each of the first and second transistors TR1 and TR2 is less than a threshold value, the output blocking circuit 506 may transmit an output blocking control signal to the AND gates. In this case, when receiving a PWM control signal having a logical value of "1" and the output blocking control signal having a logical value of, for example, "0", the AND gates output a logical value of "0", and thus the first and second switching voltages Vsw_p and Vsw_n are not output from the power drive circuit 500. Here, determination of whether to block a switching voltage may be made based on a gate-source voltage Vgs of a first or second transistor, or based on whether a first switching voltage (or a second switching voltage) is smaller than or equal to a predetermined value, for example, 10 V.

Although the above description provided with reference to FIG. 7 assumed that the output blocking control signal output from the output blocking circuit 506 is logically operated by the AND gates, the present disclosure is not limited thereto and may be implement by various logic circuits.

The power drive circuit 500 processes complementary PWM signals, for example, the first PWM signal PWM_P and the second PWM signal PWM_N by using one integrated circuit, and then may apply a boosted AC voltage (for example, the second boost voltage $V_2$) to a vibrator. Hereinafter, a process of applying an AC voltage to a vibrator will be described in detail with reference to FIGS. 8 to 11.

FIG. 8 is a diagram illustrating PWM signals according to an embodiment.

FIG. 8 illustrates examples of the first PWM signal PWM_P and the second PWM signal PWM_N. The first PWM signal PWM_P and the second PWM signal PWM_N may indicate signals that repeat a high level and a low level according to a preset cycle T.

The first PWM signal PWM_P and the second PWM signal PWM_N may be complementary. For example, as illustrated in FIG. 8, when the first PWM signal PWM_P is at a high level, the second PWM signal PWM_N may be at a low level, and when the first PWM signal PWM_P is at a low level, the second PWM signal PWM_N may be at a high level.

In one example, a duty ratio of each of the first PWM signal PWM_P and the second PWM signal PWM_N may be about 50%. In this case, $t_1$ may be 0.5 T, $t_2$ may be 1.5 T, and $t_3$ may be 2.5 T. However, the duty ratios of the first PWM signal PWM_P and the second PWM signal PWM_N are not limited thereto and may be different from each other. However, because the first PWM signal PWM_P and the second PWM signal PWM_N are complementary, the sum of the duty ratios of the first PWM signal PWM_P and the second PWM signal PWM_N is always about 100%.

In addition, because the first PWM signal PWM_P and the second PWM signal PWM_N are complementary, when the first switching voltage Vsw_p of a high level is applied to the first transistor TR1, the second switching voltage Vsw_n of a low level may be applied to the second transistor TR2. Also, when the first switching voltage Vsw_p of a low level is applied to the first transistor TR1, the second switching voltage Vsw_n of a high level may be applied to the second transistor TR2.

FIGS. 9 and 10 are diagrams illustrating an operation of a second boost circuit according to an embodiment.

In a case where the first switching voltage Vsw_p is at a first level (for example, a high or low level) and the second switching voltage Vsw_n is at a second level (for example, a low or high level), when a current flows between the ground and one of the first inductor L1 and the second inductor L2, energy corresponding to a change in current flowing through the one inductor may be stored in the one inductor, and when a current does not flow between the ground and the other inductor of the first inductor L1 and the second inductor L2, energy stored in the other inductor may be transferred to a vibrator.

FIG. 9 illustrates an equivalent circuit of the second boost circuit 320 when the first switching voltage Vsw_p is at a high level and the second switching voltage Vsw_n is at a low level.

As illustrated in FIG. 9, when the first switching voltage Vsw_p is at a high level, a current may flow between a source electrode and the drain electrode of the first transistor TR1. Accordingly, a current may flow between the first inductor L1 and the ground. The first inductor L1 is also connected to a vibrator P. The vibrator P has a non-zero load value (for example, capacitance), whereas the resistance of the ground is zero or substantially close to zero. Thus, all of a current $I_1$ flowing through the first inductor L1 may be transferred substantially to the ground. In addition, because the current $I_1$ flows through the first inductor L1, the first inductor L1 may store energy corresponding to the current $I_1$.

When the second switching voltage Vsw_n is at a low level, a current may not flow between the source electrode and the drain electrode of the second transistor TR2. Accordingly, energy stored in the second inductor L2 may be supplied to the vibrator P. For example, a current I flowing through the vibrator P may correspond to a current $I_2$ flowing through the second inductor L2.

In addition, FIG. 10 illustrates an equivalent circuit of the second boost circuit 320 when the first switching voltage Vsw_p is at a low level and the second switching voltage Vsw_n is at a high level.

As illustrated in FIG. 10, when the first switching voltage Vsw_p is at a low level, a current may not flow between the source electrode and the drain electrode of the first transistor TR1. Accordingly, the energy stored in the first inductor L1 may be supplied to the vibrator P. For example, the current I flowing through the vibrator P may correspond to the current $I_1$ flowing through the first inductor L1.

When the second switching voltage Vsw_n is at a high level, a current may flow between the source electrode and the drain electrode of the second transistor TR2. Accordingly, a current may flow between the second inductor L2 and the ground. The second inductor L2 is also connected to the vibrator P. The vibrator P has a non-zero load value (for example, capacitance), whereas the resistance of the ground is zero or substantially close to zero. Thus, all of the current $I_2$ flowing through the second inductor L2 may be transferred substantially to the ground. In addition, because the current $I_2$ flows through the second inductor L2, the second inductor L2 may store energy corresponding to the current $I_2$.

In addition, each of the first switching voltage Vsw_p and the second switching voltage Vsw_n has a frequency corresponding to the PWM signal and corresponds to a voltage signal that repeats a high level or a low level. Thus, the switching states described above with reference to FIGS. 9 and 10 may be quickly repeated. Counter electromotive force of the inductor may be proportional to an inductance value L of an inductor and a change in current over time $$\left(\frac{di}{dt}\right)$$

as illustrated in the following Equation 2.

$$V = L\frac{di}{dt} \qquad \text{Equation 2}$$

Therefore, as the first boost voltage $V_1$ increases and thus the current I flowing through an inductor increases, or as a switching speed increases (that is, a cycle of the PWM signal is shortened), a higher voltage may be applied to the vibrator P.

In the embodiment, a switching driver circuit for driving an ultrasonic vibrator and the power drive circuit illustrated in FIGS. 6 and 7 may be integrated into one IC, and thus a size of a printed circuit board (PCB) may be reduced.

FIG. 11 is a graph illustrating a change in voltage applied to the vibrator P according to an embodiment.

Referring to FIG. 11, a change in voltage applied to the vibrator P is illustrated according to the circuit configurations described with reference to FIGS. 3 to 10. In an example of FIG. 11, peak-to-peak voltages of an AC voltage applied to the vibrator P may be in a range of about 55 V to about 70 V. This range is at least 13.1 times to 20.6 times greater than a battery voltage (for example, about 3.4 V to about 4.2 V). As such, according to the present disclosure, it can be seen that an AC voltage having a high voltage value may be applied to the vibrator P without excessively increasing sizes and power consumption of all circuits.

Returning back to FIG. 3, when the second boost voltage $V_2$ is applied to the vibrator P from the second boost circuit 320, the vibrator P may generate ultrasonic vibration and atomize an aerosol generating material. The processor 160 may control the battery 110, the first boost circuit 310, and the second boost circuit 320. For example, the processor 160 may transmit an enable signal instructing the first boost circuit 310 to boost a voltage and transmit an enable signal and a PWM signal to the second boost circuit 320.

FIG. 12 is a diagram illustrating a circuit configuration of a cartridge according to an embodiment.

FIG. 12 illustrated a circuit configuration of a cartridge in an example in which the vibrator P is included in a cartridge (for example, the cartridge 20 illustrated in FIG. 2).

The cartridge may include a resistor $R_0$ for removing or filtering noise generated in the process of applying an AC voltage (for example, the second boost voltage $V_2$) from an external power supply (for example, the second boost circuit 320 illustrated in FIG. 3) to the vibrator P. For example, the resistor $R_0$ may be mounted in one region of a printed circuit board and arranged in the cartridge in a state of being electrically connected to the vibrator P.

As illustrated in FIG. 12, a feedback circuit is formed in which the resistor $R_0$ and the vibrator P are electrically connected to each other in parallel such that noise included in a voltage signal applied to the vibrator P may be removed or filtered. For example, the resistor $R_0$ removes noise generated during an operation (or "power on") of an aerosol generating device (for example, the aerosol generating device 10 illustrated in FIG. 1 or 2), and thus a stable voltage is applied to the vibrator P. In addition, the resistor $R_0$ may remove or filter the noise generated between the vibrator P and an external power supply at the moment an AC voltage is first applied to the vibrator P or while the AC voltage is being applied to the vibrator P. Accordingly, the vibrator P may be prevented from being damaged due to noise, and the cartridge or the aerosol generating device may stably operate.

According to an embodiment, the resistor $R_0$ may have a resistance value of about 0.8 MW to about 1.2 MW, and thus noise included in a voltage signal applied to the vibrator P may be removed. However, the resistance value of the resistor $R_0$ may be partially changed depending on embodiments.

The descriptions on the embodiments described above are merely examples, and it will be understood by those skilled in the art that various changes and equivalents thereof may be made. Therefore, the scope of the disclosure should be defined by the appended claims, and all differences within the scope equivalent to those described in the claims will be construed as being included in the scope of protection defined by the claims.

The invention claimed is:

1. An aerosol generating device comprising:
- a battery configured to supply a battery voltage;
- a first boost circuit configured to boost the battery voltage to a first boost voltage higher than the battery voltage;
- a second boost circuit configured to generate first and second switching voltages respectively based on first and second PWM signals, and boost the first boost voltage to a second boost voltage according to the generated first and second switching voltages;
- a vibrator configured to generate ultrasonic vibration according to the second boost voltage, and atomize an aerosol generating material; and
- a processor configured to control the battery, the first boost circuit, and the second boost circuit.

2. The aerosol generating device of claim 1, wherein the second boost circuit includes:
- a power drive circuit configured to generate the first and second switching voltages respectively based on the first and second PWM signals input from the processor; and
- a voltage boost circuit configured to boost the first boost voltage to the second boost voltage according to the first and second switching voltages output from the power drive circuit.

3. The aerosol generating device of claim 2, wherein the boost circuit includes:
- a first inductor having one terminal to which the first boost voltage is applied and another terminal connected to one terminal of the vibrator;
- a first transistor connected to another terminal of the first inductor and configured to switch a current flowing between the first inductor and a ground according to the first switching voltage;
- a second inductor having one terminal to which the first boost voltage is applied and another terminal connected to another terminal of the vibrator; and
- a second transistor connected to the other terminal of the second inductor and configured to switch a current flowing between the second inductor and the ground according to the second switching voltage.

4. The aerosol generating device of claim 2, wherein the power drive circuit further includes an output blocking circuit configured to block an output from the power drive circuit when any one of the first and second switching voltages is less than or equal to a threshold voltage.

5. The aerosol generating device of claim 2, wherein the power drive circuit is implemented as one integrated circuit.

6. The aerosol generating device of claim 1, wherein
- the first boost voltage is at least three times greater than the battery voltage, and
- the second boost voltage is at least four times greater than the first boost voltage.

7. The aerosol generating device of claim 1, wherein the battery voltage and the first boost voltage are direct current (DC) voltages, and the second boost voltage is an alternating current (AC) voltage.

8. The aerosol generating device of claim 1, wherein the first boost circuit includes:
- a DC-DC converter including an input terminal to which the battery voltage is applied, a switch terminal connected to the input terminal through a power inductor, a reference voltage terminal, and an output terminal for outputting the first boost voltage;
- a first resistor having one terminal connected to the output terminal and another terminal connected to the reference voltage terminal; and
- a second resistor having one terminal connected to the reference voltage terminal and another terminal connected to a ground.

9. The aerosol generating device of claim 8, wherein the DC-DC converter is configured to output the first boost voltage based on a ratio of the first resistor to the second resistor.

10. The aerosol generating device of claim 3, wherein
- the first transistor includes a semiconductor switch configured to switch a current flowing between a source electrode of the first transistor connected to ground and a drain electrode of the first transistor connected to the other terminal of the first inductor, according to the first switching voltage applied to a gate electrode of the first transistor, and
- the second transistor includes another semiconductor switch configured to switch a current flowing between a source electrode of the second transistor connected to the ground and a drain electrode of the second transistor connected to the other terminal of the second inductor, according to the second switching voltage applied to a gate electrode of the second transistor.

11. The aerosol generating device of claim 1, wherein the first PWM signal and the second PWM signal are complementary to each other.

12. The aerosol generating device of claim 3, wherein, when the first switching voltage is at a first level and the second switching voltage is at a second level,
- a current flows between one of the first and second inductors and the ground such that energy corresponding to a change in a current flowing through the one of the first and second inductors is stored in the one of the first and second inductors, and
- a current does not flow between the other of the first and second inductors and the ground such that energy stored in the other of the first and second inductors is transmitted to the vibrator.

* * * * *